Dec. 13, 1949     J. E. MARTIN     2,491,124

DRAINAGE DEVICE

Filed March 23, 1946

INVENTOR.

John Edward Martin

BY

Cromwell, Greist & Warden

ATTORNEYS

Patented Dec. 13, 1949

2,491,124

UNITED STATES PATENT OFFICE 2,491,124

DRAINAGE DEVICE

John Edward Martin, Oak Park, Ill.

Application March 23, 1946, Serial No. 656,753

4 Claims. (Cl. 47—38)

1

The present invention pertains to a novel and improved device for use in association with a soil-filled pot, jar or similar container for plants and the like to drain local accumulations of water therefrom, preventing stagnation of the water and rotting of matter in the soil, with consequent restriction of the healthy growth of a plant in the container.

It is an object of the invention to provide a capillary drainage device of the type described for potted plants which requires no special provisions in the construction of the pot or like container with which the device is associated, and by which excess liquid is effectively removed from a container, even though the bottom and sides of such container be imperforate.

Another object is to provide a drainage device which may be readily and quickly inserted to any point in the soil in the pot, after the planting of the pot, enabling the device to be positioned, for example, either adjacent the bottom of the pot, adjacent the roots of the potted plant, or in any other location in which an objectionable accumulation of liquid has occurred or is likely to arise.

A more specific object is to provide a capillary drainage device including an elongated, relatively rigid, liquid-impervious tube having a quantity of strand-like wick material disposed therein, along with means for sustaining said wick material in operative position, whereby displacement thereof relative to the tube, upon the insertion of the device in the plant container, is prevented.

Yet another object is to provide a simple, inexpensive and attractive drain device for eliminating excess water from domestic potted plants and the like, which is characterized by novel wick means having ample capillary and evaporating capacity for the intended purposes.

Yet another object is to provide a liquid drainage device which completes a continuous path of liquid circulation through a mass of soil, thereby equalizing the humidity of the soil, preventing the accumulation and stagnation of water at the bottom or any other local area of the mass, accompanied by the deterioration or rotting of plant food, fertilizer or other matter normally carried by the water in its circulatory path.

The foregoing statements are indicative in a general way of the nature of the invention, but other and more specific objects will be apparent to those skilled in the art upon a full understanding of the construction and operation of the device.

2

Two embodiments of the invention are presented herein for purpose of exemplification, but it will be appreciated that the invention is susceptible of incorporation in other modified forms coming equally within the scope of the appended claims.

Figure 1:
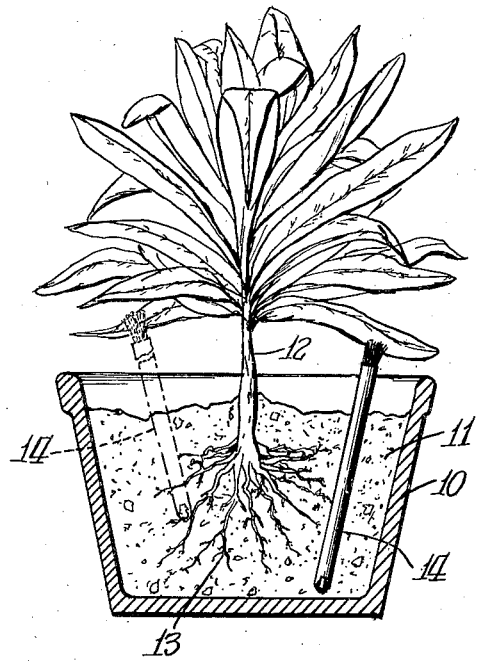
Fig. 1 is a view in transverse vertical section through an earth and plant filled flowerpot of well known type, illustrating one mode of arranging the drainage device of my invention in operative relation to a potted plant, and showing in dotted lines an alternative arrangement of the device.

The present invention affords a simple and inexpensive drainage device for the removal of excess localized accumulations of water from an earth-filled flowerpot, bowl or other plant container, contributing to an equalized distribution of moisture throughout the soil in the container. In the case of the usual plant container, particularly those which lack a drainage opening at the bottom thereof, a serious objection has existed in the fact that the inevitable accumulations of excess water in the pot result in the stagnation of the water, deterioration and rotting of the plant food, fertilizer or other matter in the soil in which the plant is set, and consequent damage to the plant itself, or retardation or halting of its normal health and growth. The water which is from time to time supplied to the plant is a carrier for various types of fertilizer and plant food, enabling the same to be forwarded expeditiously through the soil to the roots of the plant. Obviously, the beneficial action of these foods and fertilizers is impeded or destroyed if they are permitted to reach a state of deterioration prior to exerting their growth-promotional function. Likewise, a great excess of water at one point in the plant container may be accompanied by undue dryness at another.

The present device eliminates the above objections in providing for the expeditious capillary removal to and evaporation of excess liquid in substantial capacity at the top of the soil, thereby establishing a continuous circuitous path for the travel of liquid through the soil and equalizing the humidity of the latter. The device includes an improved absorptive wicking element housed in a liquid-impervious tube or envelope, and exposed at both ends thereof, said tube having provisions for retaining the wicking material from displacement during insertion of the tube in the soil.

Along with the foregoing benefits, the device obviates the danger of "drowning" plants in injudicious and excess watering. Furthermore, it induces proper aeration of the soil at the plant roots.

Referring to the drawings, the reference numeral 10 designates a pot, bowl, container or the like for growing plants, which is of a standard character, being completely closed at its inclined side and bottom, i. e., there being no provisions for the gravity drainage or other type of removal of liquid at either of these areas. The container 10 is normally filled with a quantity of soil 11 treated or enriched, if desired, by the addition of any of a large number of standard soil foods, fertilizers, etc. A growing plant is designated by the reference numeral 12, having the roots 13 thereof extended in normal growing disposition substantially beneath the surface of the soil.

The reference numeral 14 generally designates the drainage device of this invention; this is illustrated in Fig. 1 in two alternative positions thereof in use. In solid lines the device is shown in a substantially upright position, resting near or on the bottom of the container 10 and projecting above the surface of the soil 11 in the latter, whereas in dotted line the device is shown with the lower end thereof located adjacent the roots 13, the top also extending above the soil. It will be understood that the device 14 is intended to be disposed with its lower end at any point at which an objectionable local accumulation of liquid is found or apt to be found; and in any operative position of the device it is located to extend upwardly of the soil in the container, its end projecting above the surface. So located, the device functions rapidly and efficiently in removing excess moisture upwardly to the top of the device, where it is evaporated in obvious manner.

Referring to Figs. 2 through 5, wherein specific details of construction of the device 14 are illustrated, the latter comprises an external, elongated tube or sleeve 15 fabricated of material which is impervious to penetration by water or other liquid solutions or compositions normally found in the soil. It is also relatively stiff to enable its thrusting insertion into the pot, in the manner illustrated in Fig. 1, after the plant has been set and the pot filled with soil. A cylinder of well known cellulose-base plastic material, Pliofilm Celluloid, fiber, or other appropriate composition in suitable gauge will be suitable for my purpose. Also, coated or treated fiber board, metal, or any of a large number of different types of readily available plastic material are available for use. Similarly, simple equivalents of such preformed rigid envelope or tube will occur to those skilled in the art.

Figures 2, 3:
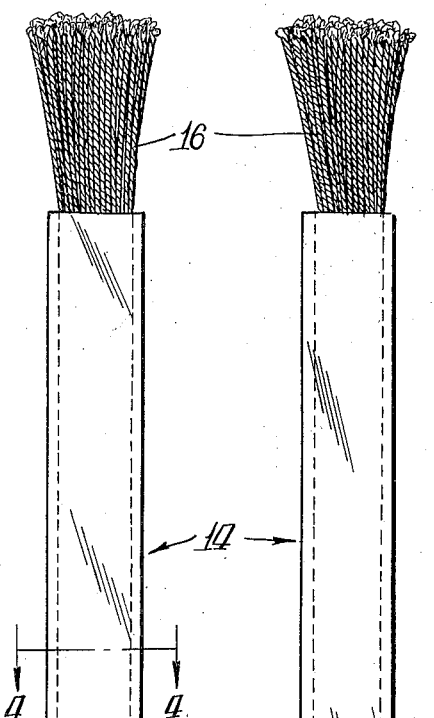
Fig. 2 is an enlarged face view of the drainage device in elevation.
Fig. 3 is an enlarged view in side elevation, further illustrating the structure of the device.
Figure 4:
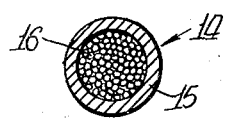
Fig. 4 is a view in section on a line generally corresponding to line 4—4 of Fig. 2.
Figure 5:
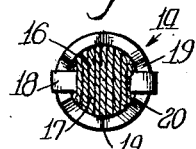
Fig. 5 is a bottom plan, viewed endwise of the device, further illustrating certain wick locking provisions.

Internally of tube 15, there is disposed a quantity of strands 16 of a suitable absorbent wicking material, such as loose-bodied string. These strands are bent double upon themselves, with the bight 17 thereof disposed adjacent the lower or forward end of tube 15. A retainer element 18, which may be of material similar to that of the tube, is disposed through said bights, having rearward engagement with the forward end of the tube 15, as illustrated in Figs. 2 and 3. This prevents rearward displacement or shifting of the wick strands 16 in tube 15 when the latter is thrust downward through the soil.

The ends of retainer element 18 may be curved rearwardly to reduce their resistance to the insertion of the tube in the soil. For the same purpose of facilitating insertion, as well as of further exposing the lower end of the strand-like wick, the tube 15 is preferably shaped to impart a pointed character to its lower end. In the illustrated embodiment, the tube end is slotted to provide V notches 19 exposing the strands and to define the points 20 whereby ready insertion of the tube into the soil is made possible. Retaining member 18 fits in opposed notches, as illustrated in Fig. 3, locking the wick effectively in place.

At their opposite ends the strands 16 project a substantial distance above the adjacent or top tube end. These strands are preferably fabricated of a suitably soft, absorbent string material of loose body, and it will be observed that the multiplicity of strands presents a relatively large area at the exposed end of the device for large capacity evaporation of liquid therefrom. Sufficient of the strands are employed to fill the interior of tube 15 well and provide ample capillary capacity.

It is believed that the intended use and operation of the device are well understood from the foregoing description. It may be disposed wherever desired in the plant pot for a period adequate to remove the undesirable accumulation of liquid, then shifted at will or as dictated by the conditions prevailing in the pot. It will be apparent that the device eliminates the need for special provisions in the pot itself to insure removal of excessive moisture. It may be inserted after the pot has been planted, eliminating the need for special care or provisions to this end during the planting operation. The device, in operation, completes a normal circulatory path for liquid with which the plant is supplied, removing the excess liquid by evaporation and without messiness after said liquid has traversed its circuit.

Figure 6:
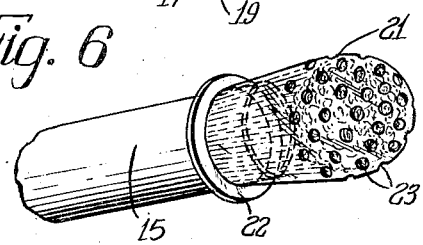
Fig. 6 is a fragmentary perspective view illustrating a modified embodiment of the invention.

In Fig. 6 I illustrate a modified embodiment of the invention, similar in all respects to the structure illustrated in Figs. 1 to 5, with the addition of a perforated cap 21 to house the exposed evaporating ends of the strands 16. This cap has a bead or flange 22 fitting over or screwed on the upper end of tube 15 and carries a multiplicity of ventilating holes 23 enabling free access of air to the strands and resultant unimpeded evaporation from the latter. The cap 21 improves the appearance of the device to a considerable extent and protects the exposed ends of the strands 16 from clogging or other damage as the result of coming into contact with the adjacent surface of the soil.

It will be noted, with reference to Fig. 1, that the device 14 should not only extend above the surface of the soil 11 but also to, and appreciably above, the top lip of the pot or container. This eliminates the possibility of inadvertent wetting of the wick 16 during watering of the plant, which would offset or destroy the beneficial action of the device.

Although particular reference has been made to use of the device in connection with potted plants or the like, it will be readily appreciated that it has utility in the proper growing of unpotted plants, by reason of its adaptability to be thrust into the earth, notwithstanding a considerably compact condition of the latter. It is the elongated character and rigidity of the tube or enveloping means 14 for the capillary material which enable the versatility of use referred to in preventing stagnation and rotting at local areas of excess humidity, completion of a normal circulatory path for liquids carrying plant foods and/or fertilizers, prevention of overwatering and "drowning" of the plants, aeration of the soil adjacent the roots for optimum growth, and many other beneficial results to which a balanced condition of humidity in the soil or earth contributes.

Those skilled in the art will immediately appreciate that various further modifications, alterations or revisions of the structure described above are readily possible, within the scope of the invention. I therefore desire that the latter be construed sufficiently broadly to cover all such obvious modifications, within the scope of the appended claims.

What I claim is:

1. A device for draining liquid from any location in a volume of soil filling a plant container, comprising an elongated, liquid-impervious tube, a multiplicity of doubled strands of wick material extending throughout the tube, the bights of said strands being exposed at the forward end of said tube, and a transverse strand-securing element extending through said bights and engaging said tube to prevent shifting of the strands relative to the tube upon insertion of said forward end substantially below the surface of said soil, said tube being of sufficient length to extend above the soil surface in any position of the tube in the soil for the evaporation of moisture from the air-exposed wick material.

2. A device for draining liquid from any location in a volume of soil filling a plant container, comprising an elongated, liquid-impervious tube, a multiplicity of doubled strands of wick material extending through the tube, the bights of said strands being exposed at the forward end of said tube, and a transverse strand-securing element extending through said bights and engaging said tube to prevent shifting of the strands relative to the tube upon insertion of said forward end substantially below the surface of said soil, said forward end being sharpened to facilitate said insertion, said tube being of sufficient length to extend above the soil surface in any position of the tube in the soil for the evaporation of moisture from the air-exposed wick material.

3. In a device for draining liquid from soil filling a plant container, comprising an elongated, liquid-impervious tube open at both ends and provided with a multiplicity of doubled strands of wicking material extending throughout the length of the tube, said strands having the bights thereof arranged at a forward end of said tube, a transverse, strand-securing element extending through said bights and engaging said tube to prevent shifting of the strands relative to the tube upon insertion of said end substantially below the surface of said soil, said forward end being pointed to facilitate said insertion, the strands projecting a substantial distance outwardly of the opposite tube end for the evaporation of moisture therefrom.

4. In combination with a soil-filled plant container, a device for draining liquid from any location in the soil filling said container, comprising an elongated, liquid-impervious tube open at both ends and provided with a multiplicity of doubled strands of wicking material extending throughout the length of the tube, said strands having the bights thereof arranged at a forward end of said tube, a transverse, strand-securing element extending through said bights and engaging said tube to prevent shifting of the strands relative to the tube upon insertion of said end substantially below the surface of said soil, said forward end being pointed to facilitate said insertion, the strands projecting a substantial distance outwardly of the opposite tube end for the evaporation of moisture therefrom, said opposite tube end being disposed above the surface of said earth in the operative relation of the parts.

JOHN EDWARD MARTIN.

REFERENCES CITED

The following references are of record in the file of this patent:

FOREIGN PATENTS

| Number | Country | Date |
| --- | --- | --- |
| 180,967 | Great Britain | June 8, 1922 |